United States Patent
Hugot

(10) Patent No.: US 8,260,353 B2
(45) Date of Patent: Sep. 4, 2012

(54) SIM MESSAGING CLIENT

(75) Inventor: Didier Hugot, Meudon (FR)

(73) Assignee: Gemalto SA, Meudon (FR)

( * ) Notice: Subject to any disclaimer, the term of this patent is extended or adjusted under 35 U.S.C. 154(b) by 1059 days.

(21) Appl. No.: 12/096,061

(22) PCT Filed: Nov. 12, 2006

(86) PCT No.: PCT/IB2006/003640
§ 371 (c)(1),
(2), (4) Date: Jun. 4, 2008

(87) PCT Pub. No.: WO2007/069067
PCT Pub. Date: Jun. 21, 2007

(65) Prior Publication Data
US 2008/0280644 A1 Nov. 13, 2008

(30) Foreign Application Priority Data

Dec. 13, 2005 (EP) ..................... 05292698

(51) Int. Cl.
*H04B 1/38* (2006.01)
*H04L 12/58* (2006.01)
(52) U.S. Cl. ..................... 455/558; 455/412.1
(58) Field of Classification Search ............... 455/412.1, 455/558; 709/203
See application file for complete search history.

(56) References Cited

U.S. PATENT DOCUMENTS

| | | | |
|---|---|---|---|
| 5,920,826 A * | 7/1999 | Metso et al. ................. | 455/557 |
| 7,673,141 B2 * | 3/2010 | Kilian-Kehr et al. ......... | 713/168 |
| 2002/0076004 A1 | 6/2002 | Brockenbrough et al. | |
| 2005/0071282 A1 | 3/2005 | Lu | |
| 2005/0164720 A1 * | 7/2005 | Huang .......................... | 455/466 |
| 2005/0277432 A1 * | 12/2005 | Viana et al. ................... | 455/466 |

FOREIGN PATENT DOCUMENTS

| EP | 1365607 B1 | 11/2003 |
|---|---|---|
| EP | 1496480 A1 | 1/2005 |

OTHER PUBLICATIONS

Urien, P, "Internet card, a smart card as a true Internet node", Computer Communications, Elsvier Science Publishers BV, Amsterdam, NL, vol. 23, No. 17.
Guthrey, S et al, "How to turn a GSM SIM into a Web Server", Nov. 1, 2000, pp. 1655-1666, XP004238469, ISSN: 0140-3664, Whole Document.

* cited by examiner

*Primary Examiner* — George Eng
*Assistant Examiner* — Nam Huynh
(74) *Attorney, Agent, or Firm* — The Jansson Firm; Pehr B. Jansson

(57) ABSTRACT

The invention relates to a portable device (in particular a SIM card), a communication device (in particular a cellular phone) and a system comprising a portable device and a communication device. The portable device of the invention comprises processing means, external communication means, message storage means, and a web server. It has no messaging user interface. The portable device further comprises a messaging client comprising web communication means for communicating with the web server, and comprising message management means for managing messages including at least one message stored in the portable device. The communication device of the invention may comprise a message proxy.

34 Claims, 3 Drawing Sheets

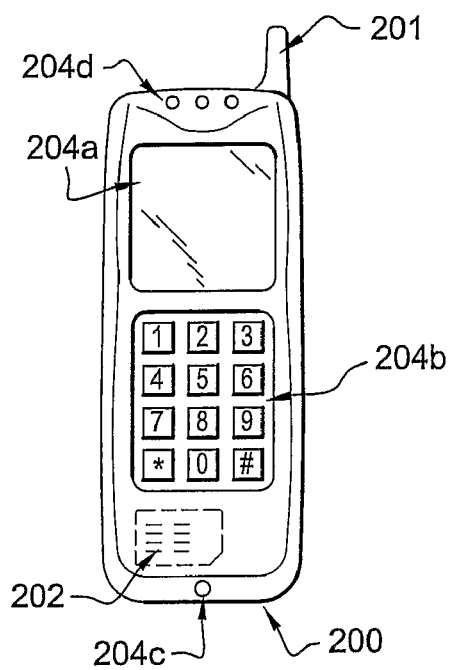
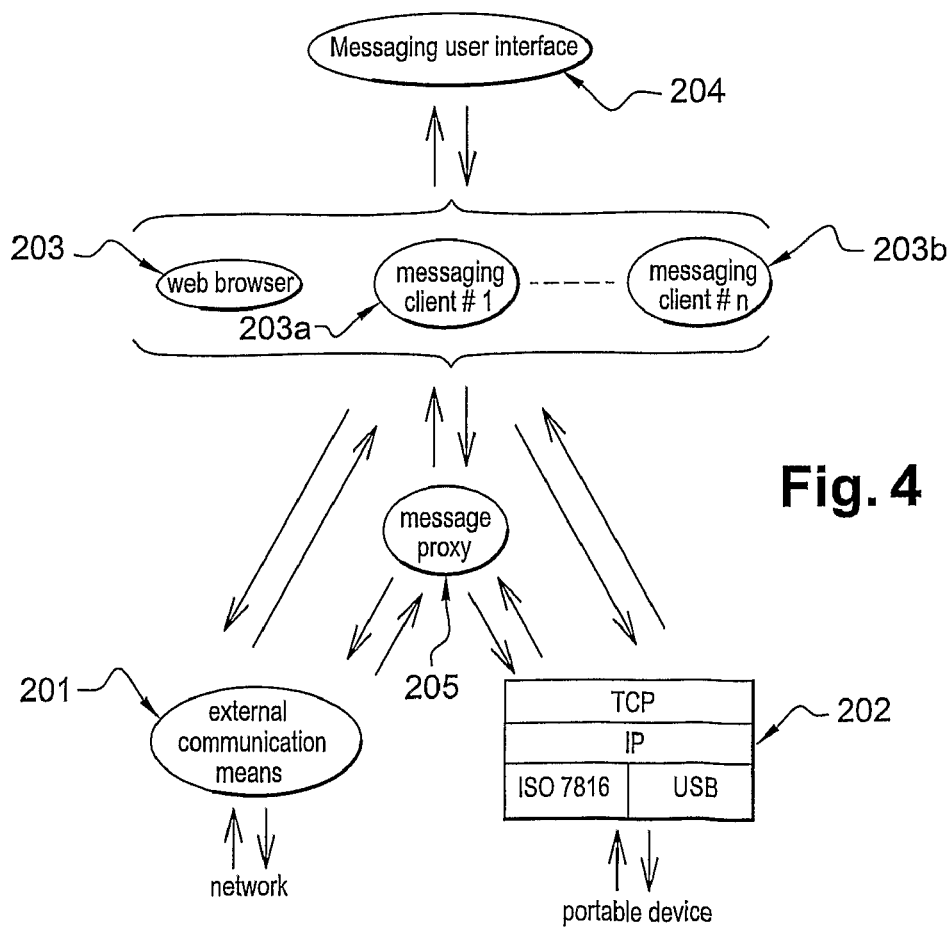
Fig. 3
Fig. 4

SIM MESSAGING CLIENT

BACKGROUND OF THE INVENTION

1. Field of the Invention

The present invention relates to the improvement of the management of the messaging features of a communication device cooperating with of a portable device.

2. Description of the Related Art

A communication device is an electronic device able to communicate over a network (be it wired or wireless). GSM, UMTS, WiFi, IrDA, Bluetooth, FireWire, USB, Ethernet or PLC (power line communication) are non-limitative examples of networking technologies that can be used by the communication device in order to communicate.

The communication device can be a mobile phone, a Personal Digital Assistant (a.k.a PDA), a smart phone (i.e. a mobile phone with PDA capability), a laptop or desktop computer, an Internet kiosk, etc. The communication device comprises at least one messaging user interface, at least one web browser, and possibly one or more messaging clients.

A user interface is defined as an aggregate of means comprising hardware means (e.g. keyboard, mouse, joystick, screen, microphone, loudspeaker, etc.) by which the users (in particular human beings) interact with a particular machine (the communication device). A user interface may also comprise software means defining a particular manner of using the hardware means of the user interface, for example such software means may consist of a GUI (graphical user interface) defining the elements which have to be displayed on a screen (buttons, text boxes, icons etc.). When possible, such software means are made independent of the hardware means (e.g. an HTML page is normally displayed in the same manner on the cathode-ray tube screen of an IBM PC desktop computer or on the liquid crystal display of a Macintosh laptop). A messaging user interface is defined as a user interface usable for accessing messages, including complex messages, in a user-friendly manner. Complex messages are messages with high entropy. The concept of entropy is well known in information theory. In simplified terms, the entropy of a message is the average number of bits needed to encode the message optimally. In the context of the invention, an entropy is high if it is greater than 100. A user-friendly manner is defined as a manner such that the user can access at least a high entropy subset of a message at the same time. A high entropy subset of a message is defined as a subset of a message, the subset having a high entropy (more than 100). The notion of same time is defined with respect to a human being's senses, which can hardly distinguish the order of events occurring within a very short period of time such as one tenth of a second. Therefore any time within a time interval of one tenth of a second is considered to be the same time. Accessing a message is defined as providing the user with the knowledge of the contents of the message, and may also encompass manipulating the message (e.g. editing, moving, deleting, etc.). A message is any information, thought or idea expressed in a plain or secret language, prepared in a form suitable for transmission by communication means. In general messages involve a human being in the sense that they target human beings and/or are generated by human beings. Different types of messages are used in state-of-the-art systems (text messages, messages consisting of sounds, images, movies, etc.). Let's consider text messages containing 100 printable ASCII characters (there are 95 possible printable ASCII characters). The entropy of such messages is $Log_2(95^{100})=657$, which is more than 100. Consequently, a 100-character wide one line display (or a ten lines by ten columns display) usable for displaying any possible 100 printable ASCII characters message is an example of messaging user interface. Let's consider a headset used for a voice communication encoded at an average 8 kbit/s (low quality used in particular for cellular phones). During one tenth of a second, around 800 bits are transmitted (which is more than 100), therefore this headset used in this application is another example of a messaging user interface. A second series of examples is given below for user interfaces which are not considered messaging user interfaces. An LED (light emitting diode) installed on a communication device can be used to indicate whether there is some communication going on or not. Although the same LED could be used to send elaborate messages (e.g. in Morse code), what matters here is the actual application in which the LED is used and the amount of information (i.e. message complexity) that can be communicated to the user at a given point in time, i.e. LED ON or LED OFF (two possible "messages"). Either the LED is on and there is some communication going on (LED ON) or it is off indicating that there is no communication (LED OFF). The entropy is $Log_2(2)=1$, which is below 100. Similarly, a piezoelectric diaphragm can be used to produce a beep or series of beeps informing the user of a failure of the communication device, such as a personal computer motherboard, and the number and duration of beeps provides some diagnostic information. Here again, what matters is that at a certain point in time there is a beep or there is no beep, therefore only two subsets of messages are possible (although the succession of beeps forming the overall message may have a more elaborate meaning). It should be noted that the aforementioned headset used in the application described for the piezoelectric diagram (simple diagnostic beeps) is not a messaging user interface. Indeed, although the headset would potentially have the capability to communicate a complex message in a different application, it doesn't communicate complex messages in the application considered in this context. Yet another example of user interface not considered a messaging user interface is an LCD (Liquid Crystal Display) used solely to display any six decimal digit number, as is the case on certain One Time Password tokens. The entropy of such a message is $Log_2(10^6)=20$, which is below 100. Although the same LCD might have the capability to display complex messages in a different application, the One Time Password token of the example doesn't take advantage of such possibility. Therefore an LED, an LCD or a piezoelectric diaphragm used in the applications cited in the above second series of examples does not constitute a messaging user interface in the sense of the present invention. Any user interface that is designed to convey only a limited set of messages (according to the objective criterion stated above), such as short predefined messages, is not considered a messaging user interface in the context of the invention. Practical examples of complex messages include email messages (electronic mail messages), IMS messages (Instant Messaging Service messages), SMS messages (Short Message Service messages), MMS messages, (Multimedia Messaging Service messages) or EMS messages (Enhanced Message Service messages). Usually different messaging clients manage each type of messages. The principles underlying the management of the above types of messages are well known. Those different types of messages are explained below, based on articles from WikiPedia (a free online encyclopedia), and on websites of companies specialized in mobile communications (Symbian and Ringnow). Email is a method of composing, sending, and receiving messages over electronic communication systems. Most email systems today use the Internet, and email is one of the most popular uses of the Internet. Instant Messaging Services (IMS) differ from email in that exchanges of messages happen in real time. Most IMS offer a "presence awareness" feature, indicating whether people on one's list of contacts are currently online and available to communicate. In early instant messaging programs, each letter appeared as it was typed, and when letters were deleted to correct mistakes this was also seen in real time. This made it more like a telephone conversation than exchanging letters. In modern IMS, the other party in the conversation (i.e. exchange of messages) generally only sees each line of text only after a new line is started. Instant messaging applications may also include the ability to post an away message, the equivalent of the message on a telephone answering machine. The Short Message Service, available on GSM networks, allows text messages of up to 160 characters to be sent and received via the network operator's message centre, to and from a mobile phone, or from the Internet, using a so-called "SMS gateway". If the phone is powered off or out of range, messages are stored and are delivered as soon as possible. Multimedia Messaging System (MMS) is an evolution of the Short Message Service SMS. MMS enables subscribers to compose and send messages with one or more multimedia (digital photos, audio, video) parts. Mobile phones with built-in or attached cameras, or with built-in MP3 players are very likely to also have an MMS messaging client—a software program that interacts with the mobile subscriber to compose, address, send, receive, and view MMS messages. EMS (Enhanced Messaging Service) is an evolution of SMS, from standard 160-character text messages to multi-media messages consisting of pictures, melodies, animations and styled text. EMS allows users to create and exchange pictures, ring tones and other melodies, by downloading them from the Internet or creating custom multi-media directly on the phone. EMS is built using the existing SMS infrastructure and is a cross-industry collaboration between the handset manufacturers Ericsson, Motorola, Siemens and Alcatel, and solutions developers who provide the ability to embed simple multi-media inside SMS messages. If an EMS message is delivered to a mobile phone that does not have EMS software, the user will only see the text in the same way as an SMS. EMS remains compatible with communication devices supporting SMS only because it works with the existing infrastructure laid down for SMS, and uses the same user interfaces. EMS expands the base of applications using wireless messaging. Whereas MMS is well adapted to 3G networks, EMS is suitable for current GSM infrastructure.

A messaging client is defined as a software application providing users with means for managing their messages through a messaging user interface. Managing messages comprises receiving orders from the user and executing them (or having them executed by the relevant software or hardware component, for example by means of a function call or remote procedure call). Orders from the users comprise requests for listing messages on the messaging user interface, selecting messages, retrieving messages and communicating messages to the user through a messaging user interface. Orders from the users may also comprise requests for operations such as scrolling through messages (when messages are too big to be communicated through the messaging user interface at one time), reading, editing, writing, recording (e.g. voice or picture, for example in case of a cellular phone equipped with a digital camera), deleting, sending, receiving, forwarding, filtering, sorting, broadcasting, synchronizing or archiving messages, and others known by those skilled in the art. Orders from the users can be relayed to the messaging client through intermediate software and hardware components (located between the messaging user interface and the messaging client). For example a mouse click, resulting in an interruption sending the X and Y coordinates of the cursor, can be converted into a specific order by a module linked to a graphical user interface component, such module identifying the icon that has been clicked, for example the icon "read message", and transmitting the order "read message" to the messaging client. Popular software comprising a messaging client include Qualcomm's Eudora, Netscape Mail, or Microsoft Outlook Express. In the field of cellular telephony, cellular phone manufacturers include a messaging client for managing messages such as SMS messages in the cellular phone. Web mail is a class of web applications that allow users to read and write e-mail using a web browser. Popular examples of web mail include Yahoo Mail and Microsoft Hotmail. In the context of web mail, the messaging client consists of the web application, which generates the web pages displayed in the web browser, and enables access to the messages.

As known by those skilled in the art, a web browser is a software application that enables a user to display and interact with documents hosted by web servers or held in a file system (in general through the HTTP protocol, although many browsers support other protocols such as FTP etc.). The web browser integrates or relies on a web protocol stack. Documents are in general in HTML or XML format, although many other formats are accepted as well (JPEG etc.). Popular browsers available for personal computers include Microsoft Internet Explorer, Mozilla Firefox, Opera, Netscape, Safari and Konqueror.

The invention relates to communication devices arranged to operate with a portable device. In the context of the invention, a portable device is defined as an electronic device with processing capability, without a messaging user interface, and which is portable (it is usually smaller than the communication device and the user of the communication device can easily carry it). Such portable device may have an LED or other basic user interface, which is not considered a messaging user interface given the definition of a messaging user interface stated above. The portable device has external communication means. The portable device is usually inserted in the communication device but could also communicate with the communication device without being inserted in it (e.g. radio communication or cable connection etc.). Portable devices can be connected to many communication devices. For example, USB smart cards have USB connectivity enabling their connection to almost any personal computer, to many PDAs, etc. USB smart card normally also have an ISO 7816 connectivity enabling their connection to bank ATMs, POS terminals, GSM cellular phones, healthcare kiosks (e.g. for the French Sesame Vitale card), and to any personal computer or device equipped with a smart card reader. The portable device is often used for authenticating the user of the communication device. In general, the portable device has no integrated power supply or battery, the portable device being electrically powered by the communication device. Examples of portable devices include smart cards (e.g. ISO 7816 smart card, USB smart card, SIM card, USIM card, MMC smart card, contact-less smart card etc.), dongles, USB keys, secureMMC devices, One Time Password tokens, memory cards etc. Portable devices may include a web server, as was demonstrated in October 1999 on a Schlumberger smart card by the university of Michigan (which published the source code of the software necessary to implement this web server), and by Bull CP8 (I-Simplify product). As known from state of the art, the term web server can have two meanings: (1) a computer that is responsible for accepting requests (in particular HTTP requests) from web browsers, and serving them web pages, which are usually HTML documents, or (2) a computer program that provides the functionality described in the first sense of the term. In the context of the invention, the term "web server" is taken in the second meaning. Portable devices may have message storage means for storing messages of a user of the portable device in the portable device.

A first problem with state-of-the-art communication devices and portable devices described above lies in the fact that it is difficult to transfer messages ("portability problem"). The portability problem is particularly significant when one wishes to transfer large numbers of archived messages. A first example of portability problem is observed while attempting to transfer all SMS messages stored in one cellular phone into a second cellular phone. For instance, when a user having a cellular phone acquires a new cellular phone, transferring all messages from the old cellular phone to the new one is complex in particular for the messages stored in the cellular phone memory. Even when the user can transfer personal data using existing communication channels between the two cellular phones (e.g. IrDA, Bluetooth or Wifi), such transfer usually requires manual intervention of the user (no automatic and generic way to do it). The user needs to spend a lot of time to transfer personal data, and not everybody knows how to do it. It should be noted that although many cellular phones use a SIM card, the SIM card being a portable device able to store SMS messages, the cellular phone sometimes stores messages internally rather than in the SIM card, because the cellular phone quite often has a bigger memory capacity than regular SIM cards (however certain types of SIM cards, such as VLSIM—very large SIM—offer bigger capacity than regular cell phones), and because the cellular phone may have specific messaging features (which may be proprietary) not supported by every SIM card. A second example of portability problem is observed when there's a need for transferring messages of one first type from one communication device to another communication device having no messaging client for that first type of message. This task is often manufacturer dependent, and usually requires a lot of manual operations. For example a feature for transferring all SMS messages stored in a cellular phone into the e-mail client of a personal computer is not available as far as we know. A third example of portability problem can occur within a single communication device equipped with multiple messaging clients, when there is a need for transferring certain messages from one messaging client to another messaging client (e.g. in order to display all messages stored in a given communication device from a single messaging client instead of having to read each type of message from a different messaging client). A fourth example of portability problem is observed when there's a need to transfer messages of a given type from a communication device having a first type of messaging client for that type of message to a communication device having a second type of messaging client for that same type of messages (e.g. transfer of archived emails from an email client developed by one company to an email client developed by another company). A fifth example of portability problem is the situation, similar to the fourth example above, in which there's a single communication device, equipped with two types of messaging clients for the same type of messages (e.g. Netscape mail and Outlook Express), and messages are transferred from one client to the other inside the same communication device.

A second problem with state-of-the-art communication devices equipped with a messaging client is the problem of synchronization between messaging clients ("synchronization problem"). Synchronizing two messaging clients consists primarily in making sure that every message in one messaging client and meant to be synchronized appears in the other client too. This can be useful for example when a person uses different communication devices (e.g. a PDA or laptop when traveling and a desktop Personal Computer when in the office) and needs to have access to all messages at any time, whether through one or the other device. Synchronization can occur as soon as an event is detected (e.g. whenever a new message is received, sent, deleted etc.), but it is also possible to decide that only certain events (e.g. certain types of messages) will trigger synchronization. It is possible to decide that every personal message (marked as "event to be synchronized" by methods known in state of the art such as flags) will be synchronized, but that other messages will not be synchronized. This however requires configuration by the user. Personal messages can for example be defined as messages originating from or sent to recipients belonging to a list of personal contacts defined in the messaging client. This also needs to be configured by the user. Synchronization can be performed in one way only or in both directions (a messaging client of a communication device 1 can be synchronized with a messaging client of a communication device 2 and vice versa). Synchronization can be performed continuously (whenever a relevant event is detected) or only from time to time. The latter situation can be triggered automatically on a periodic basis (e.g. every week, or every 100 messages received, etc.), or upon user request, or automatically upon detection of certain events (such as detection of high probability of hard disk failure by techniques known in the art such as S.M.A.R.T, Self-Monitoring, Analysis and Reporting Technology, an open standard for developing disk drives and software systems that automatically monitor a disk drive's health and report potential problems), etc. Obviously, this is again a parameter of the synchronization process, which needs to be defined by the user. More than two messaging clients can be synchronized. Such messaging clients may reside on different communication devices. Many tools and standardization bodies (such as OMA) have been put in place in order to facilitate synchronization, but synchronizing messaging clients is still inconvenient in particular for the reasons mentioned above (many configuration steps, not easy for non technicians, and many different tools with different interfaces).

A third problem with state-of-the-art communication devices equipped with a messaging user interface is the fact that messaging user interfaces are often device dependent, i.e. they are developed for that specific device and a device designed by a different manufacturer (and sometimes even a different device designed by the same manufacturer) may have a radically different messaging user interface. We'll refer to that third problem as "the messaging user interface problem". When a user acquires a different device, the user has to learn how to use a new messaging user interface, while it would have been more convenient to keep a similar user interface for all communication devices.

A fourth problem with state-of-the-art communication devices equipped with a messaging client is the "operator messaging services problem". Communication devices are under the control of the persons who own them, rather than under the control of the operators of the networks to which such communication devices are connected. For example, in the field of cellular telephony, only the SIM card is the property of the operator whereas the handset belongs to the user or to a third party. As a consequence, it is difficult and sometimes not possible for an operator to manage data stored in the handset without asking the user permission for each action (in particular when such data is stored in a secure repository, which does no grant access without user authorization, and which is not designed to grant access to the operator through the network). Even in situations where such access is made possible, most often there is no tool or protocol letting the network operator know whether the user has accepted the handset operation or not. Therefore performing tasks such as operator services is not easily performed in a transparent way, even if the user wishes to benefit from those tasks. For example, despite his subscription to an operator service, the user might have to accept any access of the operator to its personal data (messages), which might happen very often and therefore be a nuisance for the user. Sometimes such access is not even possible. Examples of operator services to which a user could be willing to subscribe include backup services in which the operator keeps a copy of the user's messages (SMS, MMS, EMS, etc.) on a server, in case the cellular phone is lost, stolen, or damaged.

A fifth problem is the problem of "messages security". As communication devices are not necessarily specific to one user but may be exchanged or shared between users, all the messages may become readable by anybody having access to the communication device, which raises the issue of security, in particular confidentiality. In general, messages stored in cellular phones are not by default protected by any pin code, encryption or signature mechanism. Although techniques to ensure the confidentiality of messages that are stored in the device (such as those mentioned above) could be devised, they are not usually implemented or activated and would require manual actions to install an application and configure it. Considering that many users use only the most basic features of their communication devices and do not plan to learn how to perform complex tasks that would enable better protection, and are not necessarily informed of the fact that their messages are not protected, we face a security problem.

A sixth problem is the problem of "message availability". Some communication devices rely on a messaging client located on a server. Alternatively, such communication devices may simply store messages on that server which then acts as a message repository. According to the invention, this sort of implementation, while partially addressing certain aspects of the aforementioned problems, turns out not to be completely satisfactory. Messages can only be read when the communication device is connected to the network. Therefore messages are not accessible when the network is down or when the communication device in offline for any reason. In addition, when the access to the network is not charged on a fixed price basis but with respect to the actual use of the network (e.g. connection duration or quantity of data transmitted), the user needs to pay each time a message is accessed, which results in a lower accessibility of the messages. In addition, access to the messages may be constrained by the bandwidth available. For example, if the network is slow, it is very inconvenient to read the messages. It is even more inconvenient to perform operations involving numerous messages such as search operations. For example if one wishes to find a particular message while only remembering that the message contains a certain keyword, one might have to load all messages through the network and filter them in the communication device, or alternatively one must have access to a software located on the server, such software executing this filtering on his behalf.

BRIEF DESCRIPTION OF THE DRAWINGS

FIG. 3 shows a communication device (mobile phone according to a preferred embodiment of the invention).

FIG. 4 is a schematic view of the software architecture of the mobile phone of FIG. 3.

DETAILED DESCRIPTION OF THE INVENTION

Figure 1:
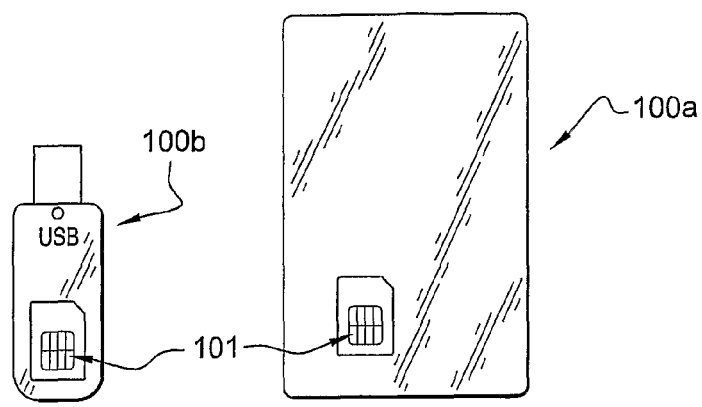
FIG. 1 shows two portable devices according to the invention.

The present invention relates to a portable device, a mobile phone and a system comprising a communication device and a portable device, which are adapted for managing the messages of a user.

A portable device according to the invention comprises processing means (e.g. the processor of a smart card chip such as microcontrollers of the ST22 family of ST Microelectronics), external communication means for communicating with other devices (in particular communication devices), message storage means for storing messages of a user of the portable device in the portable device, a web server. It is considered implicit in the definition of a portable device that a portable device has no messaging user interface. External communication means may rely on contact or contact-less technology (e.g. ISO 7816, USB, Bluetooth, etc.). The portable device may be inserted in a communication device (or in a communication device peripheral such as a smart card reader) on a permanent basis, or only when an interaction between the portable device and the communication device is needed, or not inserted at all (e.g. contact-less communication). The portable device further includes a messaging client comprising web communication means for communicating with the web server, and message management means for managing, through web pages accessible from the web server, messages including at least one message stored in the portable device. The message management means are means well known in state of the art messaging clients, and comprise at least one of the following: message listing, selecting, retrieving, reading, scrolling, editing, writing, recording, deleting, sending, receiving, forwarding, filtering, sorting, broadcasting, synchronizing or archiving means. The messaging client generates web pages (e.g. in HTML, XHTML, WML, DHTML, XML, XSL etc.) which are displayed for example on a web browser (in the context of the invention web browsers include WAP browsers) of a communication device to which the portable device is connected. The web pages can be generated dynamically, using parameters that can be modified (e.g. with OTA for a SIM card) thereby influencing the web page (e.g. its layout, presentation etc). The parameters can be linked to the type of communication device (e.g. screen size and the different communication device characteristics), accordingly the messaging client can generate a web page that is simple or more complex (e.g. low resolution black and white icons versus high resolution and animated color icons), while preserving the overall layout. The user of a communication device may therefore launch a web browser, connect to the messaging client of the portable device through a URL in the browser (which may be the default URL), and manage messages through the web browser. Classical operations possible with a messaging client are now accessible from the web browser, for example text messages might be simply displayed in the browser, the user may scroll through the message in case it is too big to fit on one screen, video messages can be played on a screen of the communication device, audio messages being played on a loudspeaker of the communication device, etc. Preferably, the messaging client of the portable device is autonomous. The autonomous nature of the messaging client means that there exist off-the-shelf communication devices such that the portable device equipped with such autonomous messaging client can cooperate with such off-the-shelf communication devices without modification of the communication device (i.e. without adding new software or hardware components). For example, in the case of a SIM card, the messaging client of the SIM card can use a Send SMS command available in SIM Toolkit (a well known tool enabling a SIM smart card which is traditionally a slave of a cellular phone to become the master and have the cellular phone execute orders on its behalf) in order to have a cellular phone send an SMS when the user requests an SMS to be sent. Similarly, it is possible to manage email accounts with their settings (POP server, SMTP server, email address, user name, possibility to keep messages on the server etc.) and implement POP and SMTP support inside the messaging client of the portable device in order to send and receive e-mails. It is also possible to use only the SMS channel for all sorts of messages by encapsulating all communications of the messaging client in SMS messages (the SMS channel being used as an underlying communication layer—other communication layers would be possible e.g. sending APDUs through a low level API, etc.). This solution however requires that the operator install a special server component (or an plug-in in the SMS gateway) in order to detect, for example with a special tag, an SMS which payload corresponds to the portable device messaging client communications, to extract the payload and to interpret it (e.g. to communicate the relevant data contained in the payload to external servers such as synchronization server or email servers, external servers being specified in the payload of the SMS). In this example, the SMS channel being constrained in terms of bandwidth, it is possible to add an option in the messaging client, in order to get only the messages header or to define the maximum message size. In some instances, the messaging client cannot be autonomous, or it is advantageous for it not to be autonomous (e.g. for enhanced features, or for performance reasons such as the ones mentioned above with the SMS channel). In such situations, the messaging client interfaces with a message proxy (described below) installed in the communication device. The messaging client communicates with the message proxy (which is executed in the communication device) through device communication means of such portable device. In order to facilitate the deployment of the message proxy on communication devices which do not contain such message proxy, it is proposed to store the installation files of the message proxy on the portable device (or in a less preferred embodiment on another portable device such as an MMC card). The installation of the message proxy on a communication device not equipped with this message proxy is triggered by the establishment of the first communication of the portable device with the communication device. For example, in the case of a SIM card and a GSM cellular phone, the message proxy installation files can be stored in the SIM card web server (it is also possible to use an external web server for storing the installation files, but this requires an active Internet connection). The SIM card detects the first power on of the GSM phone and manages the installation of the message proxy by launching the GSM phone's web browser on a specific URL (where the installation files are stored). In order to launch the GSM phone's web browser, the SIM card preferably invokes the "launch browser" SIM Toolkit proactive command. If the GSM phone does not support this command, the SIM card can send a message to an external server that will send a WAP push message to the GSM phone. The role of the message proxy may be for example to send and receive messages on behalf of the messaging client of the portable device (e.g. when this is not possible from the portable device because a specific protocol is used, the protocol being implemented in a communication device and being proprietary and undocumented), and/or to ease or permit the implementation of synchronization means. For example, a SIM or USIM card can use a message proxy in a handset in order to send and receive messages using handset communication channels such as GPRS, CSD, or UMTS (more efficient in terms of bandwidth than an SMS channel). It should be noted that even when a message proxy is in needed on a communication device but is not installed, there is at least a limited access to the messaging client of the portable device (it is at least possible to read text messages, since this can be done through the web browser, although other functions such as sending/receiving may be unavailable). The portable device of the invention may be for example a smart card, an ISO 7816 smart card, a USB smart card, an MMC smart card, a contact-less smart card, a SIM card, a USIM card, a dongle, a USB key, a One Time Password token or a SecureMMC device. The portable device of the invention reduces the portability problem because it contains a messaging client (which is therefore carried by the user together with the portable device) and can be connected to many communication devices. Since the messaging client is not in the communication device but directly in the portable device, the portability of the messages does not depend on the availability, inside the communication device, of a messaging client compatible with the messages format used for storing messages in the portable device. The portable device of the invention can include several messaging clients (e.g. one for each type of messages such as e-mail, SMS, MMS etc.), although in a preferred embodiment there's a single messaging client managing all messages stored in the portable device. It is also possible to have multiple messaging clients, some of which are able to manage a common subset of messages (e.g. one would manage SMS only, while another one would manage SMS and e-mail). This situation can be observed for example if multiple third parties provide competing messaging clients, each having advantages and drawbacks such that the user might desire to keep multiple client messages in the portable device. However, in a preferred embodiment only one messaging client is used. It is also possible that certain types of messages are not accessible at all to the messaging client of the portable device, even though such messages are stored in the portable device (e.g. by regular storage means known in state of the art). This can happen for example when a new type or format of messages is created, which management requires specific features not available in the messaging client of the portable device but only in the messaging client of the communication device. However this drawback already exists in state of the art, therefore in general the invention is an improvement over state of the art, although in certain areas the invention offers the same level of portability as state of the art. In order to reduce the synchronization problem, the messaging client of the portable device preferably incorporates synchronization means (which form part of the message management means). The synchronization means of the invention are similar to those of state of the art solutions except that they are in a messaging client located in the portable device. However, the synchronization means of the invention are normally only needed during the transition phase (e.g. when a portable device of the invention is used for the first time). Once the synchronization is done, all messages to be synchronized are in the message repository of the messaging client of the portable device, and normally there are no more reasons to synchronize since all messages can be managed by the messaging client of the invention. Synchronization might be needed afterwards for web mail (in particular for web mail not offering a pop server) and in other rare instances, for example if the user obtains another communication device, starts using it without the portable device of the invention, and subsequently wishes to benefit from an enhanced portability with the portable device of the invention which he was already using with the first communication device. The synchronization means of the messaging client of the portable device of the invention requires a modification of the communication device (message proxy described below) if they do not have access to the message repositories that have to be synchronized. The messaging client of the invention, located inside the portable device, is accessible through a web browser, which is advantageous since many communication devices have a web browser, thereby enabling access to the messaging client of the portable device. This further improves the portability, since most recent communication devices include a web browser, and since web browsers use standard protocols which are not dependent on the actual operating system of the communication device (e.g. it is well known that a web site can be accessed in the same manner from a personal computer running a Microsoft Windows™ operating system, from an Apple™ computer running a MacOS™ operating system, or from a workstation running a UNIX™ operating system). In order to ease the transition from state of the art solutions to the solution of the invention, the messaging client of the invention preferably includes a message repository interface. This message repository interface grants access to messages managed by the messaging client of the portable device. Such access can therefore be granted to applications other than the messaging client of the portable device. Without a message repository interface, some form of access is possible (e.g. loading of web pages and parsing of the loaded page in order to locate the relevant information and/or send orders to the messaging client). However parsing is not optimal (even though using XML format for the web pages makes the operation easier), neither in terms of features nor in terms of efficiency (in particular speed). Granting access through an API rather than through a file system allows a better management of the security of the messages as described below. Granting access through an API also guarantees that only authorized management operations are performed (non authorized operations are not supported by the API, for example a low-level write access is not granted, therefore the messages cannot be corrupted by a buggy low-level write access). Existing messaging clients of the communication device which used to manage messages stored on the communication device can continue to manage messages as they did before (during the transition phase), except that the messages are now on the portable device and are accessed by the messaging client of the communication device through a the message repository interface of a messaging client located in the portable device. Therefore the messages can be access in two manners during the transition (either through the web browser of the communication device, which is the preferred solution, or through a messaging client of the communication device, as in state of the art but through the message repository interface). In order to enable this new behavior of the messaging clients of the communication device (access through the message repository interface instead of previous type of access), the mobile communication device may need to be modified, as described below (a message proxy may need to be added). With the message repository interface, it is also possible to use new means (not simply existing messaging clients of the communication device) other than the web browser to access the messaging client. For example, specific graphic user interface applications can be used, as well as voice only applications such as an application driven by voice orders (with voice recognition) playing/recording audio messages upon request, and optionally playing text messages with voice synthesis (technique well known in state of the art, which is able to automatically detect the language of the text and pronounce the text accordingly). Such alternative applications can be desired in order to have more features (not supported by the web browser), or to have a faster access. Indeed web access may introduce some overhead associated with the fact that web protocol are often slow. The speed can be affected if the communication between the communication device and the portable device goes through a network shared with other devices (e.g. WiFi). However web access remains available (and guarantees a better portability). The message repository interface may also be used to synchronize the messages of the portable device with an external server (backup, restore or update from an Internet website). In case the user does not want to handle such operations himself, another solution is proposed below (operator interface). Advantageously, when the messaging user interface problem described above is a concern, only the web access is authorized, all other forms of access (by other messaging clients) being deactivated (either by disabling the message repository interface or by not having such an interface in the messaging client of the portable device). Therefore the user can only use web access, and web access is very similar on any communication device. Consequently, the user simply has to get used to the hardware components of the user interface (buttons, mini-joystick etc.), and all the software part, in particular the graphical user interface, remains the same on any communication device (same web pages). In certain instances (in particular when there is not enough memory in the portable device), synchronizing all possible messaging clients is not possible. In such instances, it is advantageous to access through the messaging client of the portable device those non-synchronized messages which are online (i.e. accessible via the network communication means of the communication device) or which are stored in at least one of the communication devices currently connected with the portable device. This is advantageous because from a single communication device and from a single web browser the user can access not only messages which are in this communication device but also messages in other communication devices currently connected with the portable device and messages stored on a server connected to a network accessible to the communication device (e.g. on a server such as hotmail). Preferably, the aforementioned access is achieved with the same means as means used for the synchronization. The messages stored in communication devices currently not connected with the portable device (either directly, or indirectly through a communication device connected with the portable device) are not accessible (but this is the same as in state of the art). The messaging client of the portable device preferably comprises an operator interface for an operator to manage the messages of the user without requiring user intervention (it should be noted that, as already mentioned for the message repository interface, operator access could be performed by XML parsing of the web pages rather than by an operator interface, however the operator interface is faster, more powerful and more secure). An operator is an entity which provides network access to the communication device, in order for example to access the Internet or to voice services. In general the operator owns or rents some network equipment which is necessary for the communication device to communicate. Operators tend to offer more and more services to the users of their network. This operator interface allows the operator to perform such services on behalf of the user. It is acceptable to use the same interface as an operator interface and as a message repository interface when both interfaces have to offer similar functions. Alternatively, when very specific needs have to be addressed by one interface and not by the other, two different interfaces might be used. However in many cases it is sufficient to have a single interface, possibly with two levels of access restrictions in case security features are needed, as discussed below (certain functions being available to certain calling applications and not to other depending for example on the type of authentication). Examples of operator services include SPAM identification, antivirus scanning, message backup and old messages automatic deletion. SPAM identification consists in detecting that a message is a SPAM and taking appropriate action such as deletion of the SPAM, simple tagging of the SPAM, or transfer of the SPAM to a SPAM repository (for later retrieval, e.g. for forensics or for restoring a message wrongly considered as SPAM by the operator). Antivirus scanning is known in state of the art as well and consists in verifying whether a message is infected by a virus and taking appropriate action. Message backup consists in archiving the message repository of the portable device in case the portable device is damaged, lost, stolen, etc. In such situation, the portable device messages can be restored on a new portable device. Automatic deletion of old message can be activated in order to save memory consumption on the portable device. The operator may apply a policy customizable by the user, e.g. delete all voice/audio messages older than one week, or delete all messages marked as SPAM from the SPAM repository after 10 days. In state of the art, voice messages are usually stored in the servers of an operator but with the invention, voice messages can be moved to the portable device (advantageous for delayed off-line access, e.g. in an airplane etc.), hence the advantage of automatic deletion (important size of voice messages, while the user does not necessarily care about a message once it has been listened to). Although SPAM and antivirus scanning of the messages could be done in the message gateways of the operator, this would miss certain messages, and the operator interface is therefore useful. Indeed the portable device is not necessarily always connected to the same communication device and to the same operator (due to the portability of the portable device). It is therefore quite possible that the portable device messaging client be used on one network which does not enforce any particular antivirus policy and/or from one communication device which doesn't have an up to date antivirus, and that this portable device be then connected to a second network (and/or communication device). The second network operator might therefore automatically initiate some tasks such as antivirus cleaning upon connection. It is also possible that a virus be discovered long after it has been spread (e.g. time bombs), the operator may then scan stored message in order to check for the presence of such virus. It is also possible that messages are received in a format not known by the operator network (but known by the messaging client of the portable device), or are received encrypted (and are decrypted in the communication device or in the portable device), in which case the operator interface is extremely useful. As discussed above, the security of messages is often a concern. For example, in many cases it wouldn't be acceptable that a lost (or stolen) portable device reveal all messages that it contains to a third party. It wouldn't be acceptable either that a virus running in the communication device be granted access to the messaging client of the portable device.

The portable device of the invention therefore preferably comprises user restriction means for restricting user access to said web pages for managing messages. In particular, user restriction means may comprise user authentication means for verifying that the user possesses at least one authentication data stored in said portable device or which hash is stored in said portable device. Authentication data can be for example a user password, a PIN code, or user biometric template. It is advantageous to not store a PIN code or a user password as is but rather to hash it and store the hash of it. Indeed, if a hacker manages to break into the device, he will not be able to find the PIN code or user password. This is not always feasible for all authentication data. For example, many biometric recognition algorithms compare a scanned parameter with a reference, and the comparison is complex (it is not a simple bit by bit comparison). The comparison often measures the difference between the scan and the reference, and if it's small enough (based on an elaborate algorithm), it's considered the same. Therefore the hash of a biometric template is not enough to perform the comparison in general. In case of a biometric recognition, it is advantageous to implement a technique known as "match one card" which consists in performing the recognition inside the portable device, without having to send the reference biometric template outside the portable device. For authentication data which are used in a simple bitwise comparison, the preferred authentication method consists in asking the user to enter the authentication data, which is then sent to the portable device, hashed inside the portable device, and compared with the stored hash inside the portable device. Different techniques can be used in parallel, as they may be complementary (e.g. PIN code and biometrics constitute two different authentication factors, "what you know" and "what you are"). User restriction means can further comprise message encryption means. With message encryption means, messages are stored encrypted inside the portable device. Such encryption is performed inside the messaging client of the portable device and is preferably transparent to the user, in the sense that the user does not need to install an encryption software or explicitly indicate for each message that he wishes the message to be encrypted. The encryption means above are therefore different from classical message security solutions, and are complementary. In general message security solutions consist in encrypting outgoing messages with the public key of the recipient of the message in order to protect the message as it travels through the network. Similarly, the user can receive encrypted messages, and needs to decrypt them with his private key. In this embodiment of the invention, the message is received as usual (encrypted or not), and is then transparently encrypted inside the messaging client of the portable device (i.e. it may end up being encrypted twice). With encrypted messages, some of the operator interface features may be deactivated. This is in fact one of the other advantages of message encryption (the user has a better guarantee that the operator does not do tasks which he is not supposed to do such as spying messages). The operator can always spy messages as they are sent to the communication device through the operator network, but first the opportunity window is short (while access to the message repository of the portable device is as long as the communication device is connected to the network, i.e. sometimes permanent), and second not all messages are received by the same operator network (at least not necessarily). Of course encryption also renders certain desired operator services unavailable. For example, it is no longer possible to compress messages before backup (since encrypted messages cannot be compressed), messages cannot be marked as SPAM except in certain situations (e.g. situation where only the message body is encrypted, the message headers being left in clear text, and the message header being sufficient to identify a SPAM), etc. and user can backup with confidence that there is very little chance that the operator will read their messages (it is still possible to monitor clear text communications, but at least there is no access to the message repository, and there is no need to install an encryption software). An intermediate solution consists in encrypting messages with a key shared between the portable device and the operator. With this technique, the portable device is protected against third parties except the operator, which has to be trusted. An improvement of this technique consists in selectively encrypting certain messages with a key known only in the portable device, and others with a shared key, based on user preferences. But this solution is no longer transparent for the user. Another improvement consists in using a special kind of diversified encryption together with an authentication technique as described above. Diversified keys are known in state of the art. In the context of this embodiment of the invention, it is proposed to diversify a master cryptographic key stored in the portable device using a diversifier, the diversifier comprising at least the authentication data, the authentication data being present in the memory of the portable device only at the beginning of the authentication phase (the portable device storing only the hash of the authentication data). In other words, the hash of the authentication data is stored permanently in the portable device, but the authentication data itself is not stored permanently. The diversified key is then used to encrypt messages (enhanced message encryption means). Therefore even a physical attack on the portable device would not reveal the key used to encrypt messages since this key is not stored in the portable device. In order to access messages, the user needs to authenticate first (by sending the authentication data to the portable device). The authentication data is hashed and compared with the reference inside the portable device. If the authentication is successful, the authentication data is then used to generate the diversifier and calculate the diversified key for decrypting messages. The authentication data is erased from the memory of the portable device preferably just after the diversifier is computed and is therefore not stored permanently in the portable device, but only for a very short period of time. The diversified key is preferably kept in volatile memory (e.g. RAM) of the portable device and is destroyed as soon as it is no longer needed. It is often desirable to change PINs and passwords on a regular basis. Therefore, in the last described embodiment, changing all or part of the authentication data used for the diversifier requires message re-encryption means triggered by the modification of at least one of the authentication data comprised in said diversifier, the message re-encryption means consisting in decrypting encrypted messages with the old diversified key and re-encrypting said messages with the new diversified key. When a message repository interface of the above described type is implemented inside the messaging client, it is preferred to link this message repository interface to the same user restrictions means as described above, in order to guarantee that no application can have access to the messages in the absence of the user. The user restriction means can incorporate an additional mechanism informing the user that the message repository interface is about to be used and asking for an authorization (without necessarily requiring a new authentication in case the user is already authenticated). In case an operator interface has been implemented, or in case a single interface acting both as a message repository interface and an operator interface has been implemented, it is preferred to protect operator access to the messaging client of the portable device. Even though sometimes operator access is limited (only a small subset of functions being accessible, plus possibly a few specific operator functions), it may still be desired to use operator restriction means for restricting operator access to the messaging client, in order in particular to prevent third parties from impersonating an operator and executing operator functions on the device (e.g. retrieving copies of messages for "backup" etc.). Operator restriction means should comprise at least operator authentication means. In general it is better to use different authentication means for users and for operators. For example, a user cannot be expected to learn very complex PIN codes therefore fairly short PIN codes are often used. In addition, the user authentication is local (the user is close to the portable device and the authentication data normally does not have to travel through a complex network) while operator authentication might occur through a very complex network potentially spied at many points by third parties. Examples of authentication techniques which are well adapted in the present case (for operator authentication) comprise symmetric cryptography authentication (for example a symmetric key can be shared between the portable device and the operator, and the authentication can consist of a challenge-response by which one party sends the other party a random number, the other party returns it encrypted thereby proving its knowledge of the symmetric key). Asymmetric cryptography authentication is another possibility, which requires the set up of a certification authority. One time passwords might be an alternative (cheaper and simpler technique, by which the operator sends a password to the portable device, the password being invalidated as soon as it is used, both the operator and the portable device knowing how to compute the next password for the next time). Finally, another possible example of operator authentication is the administrative password, but it is pretty weak especially if sent in clear text on the network. Therefore this solution (by far the simplest and the cheapest) is not recommended unless security is not a primary concern. In order to mitigate the message availability problem (in particular with respect to messages stored online, such as in the case of web mail) it is advantageous to have a high memory capacity in the portable device, thereby enabling the synchronization of all messaging clients and storing of all messages in the portable device. This is complementary with the traditional approach consisting in improving the quality of the network (in particular by adding redundant network equipments) in order to reduce the message availability problem. It should be noted that thanks to the invention, it is possible to activate access to the messaging client of the portable device from a communication device distinct from the communication device connected with the portable device, as long as both communication devices are connected to the Internet (or at least to a common network or to interconnected networks) and as long as the web server is configured to be visible outside the communication device to which the portable device is connected (in such situation it is strongly recommended to activate the aforementioned authentication means). For example, the portable device can be a SIM card inserted in a cellular phone, and the SIM card's messaging client being accessible through a web server, it may be configured in order for the user to access it from a personal computer connected to the Internet, with a more comfortable messaging user interface, without removing the SIM card from the cellular phone and without connecting it to the personal computer. In a preferred embodiment, the portable device is also used to establish an association between at least one subscriber (owning or co-owning the portable device) and at least one communication network (the operator's network and optionally operator's partners networks), the subscriber being authenticated on the communication network thanks to the portable device (e.g. SIM card). However the invention also works well without this network authentication feature. Advantageously, when the communication devices contain a messaging client able to read messages from the portable device (e.g. a GSM cellular phone is able to read SMS messages stored in a SIM card), the messaging client of the portable device may store such messages in the format known by such messaging client in order to have an immediate access to such messages both from the messaging client of the portable device of the invention and from the messaging client of the communication device, without duplicating data in the portable device, and without having to go through intermediate layers such as the message repository interface. When the portable device is shared between different users, it is advantageous to have different profiles and to protect each profile separately (each with individual user restriction means) in order to avoid one user of the portable having access to another user's data. Each user therefore sees only a single messaging client corresponding to his profile and containing his messages.

A system according to the invention comprises a portable device as described above and a communication device. The communication device comprises device communication means for communicating with the portable device. One example of device communication means comprises a USB port plus a USB controller plus a USB driver plus a TCP/IP over USB layer, all such components being present by default on most personal computers (those with a recent operating system). One variant (which is becoming less and less interesting due to the progressive replacement of old style serial ports by USB ports in recent computing equipment) consists in using a DB9 connector plus RS232 controller plus RS232 serial port driver plus TCP/IP over RS232 layer (present by default on almost all computers due in particular to legacy PSTN modems which were usually connected through a serial port). With the advent of portable devices such as the Axalto Network Card (which is a well known evolution of initial TCP/IP smart cards such as Bull CP8 I-Simplify mentioned earlier), it is usually not necessary to add any low-level components (either hardware or software) in the device communication means available by default in the communication device, because such portable devices take advantage of existing standard low-level hardware and software parts usually available in standard device communication means of communication devices (such as the ones in the two previous examples). The portable device is therefore automatically identified (e.g. with an address such as an IP address which can be assigned automatically with known methods such as DHCP, or with the local address and a specific port) as a network component to which it can connect through a web protocol (such as HTTP over TCP/IP). In case some of the aforementioned low-level components are not available in the communication device for the desired portable device, they need to be added, as shown below with two examples. In a first example, the portable device consists of a smart card with a standard ISO 7816 form factor and no USB or RS232 support, the smart card encapsulating TCP/IP in ISO 7816 APDUs and having the features of claim 1, and the communication device consists of a personal computer PC. In this first example, a smart card reader has to be added on the PC (if none is present), and a TCP/IP over ISO 7816 software layer has to be added on the PC. Recent operating systems such as Windows 2000 and later provide the remaining elements including the driver for the smart card reader (for widespread types of readers available when Windows 2000 was released), and the low-level software components needed to access the card through the reader, such as PC/SC components. It is possible to install more recent versions if needed. Therefore in this first example the device communication means of the communication device are not fully available in most "off-the-shelf" PCs and some components need to be added, unlike in the preferred embodiment (e.g. Axalto Network Card, which can work with an "off-the-shelf" PC). In a second example, the portable device and communication device consist of a SIM card used in a GSM phone. The device communication means comprise a SIM card slot plus the electronic and software components needed to communicate through this slot via the ISO 7816 protocols (all of which are present on all GSM phones) plus a TCP/IP over ISO 7816 layer, this last layer having to be added in many GSM phones which do not integrate it by default. This layer may consist of an HTTP proxy allocating a local port number (for example 5050) corresponding to the SIM card. When the browser attempts to access an URL on this port (for example http://127.0.0.1: 5050 . . . , "127.0.0.1" being the TPC/IP address for local access), the HTTP request is then sent to this HTTP proxy which forwards it to the SIM HTTP web server. A communication device of a system according to the invention further comprises a messaging user interface, such as an LCD screen, a Braille interface (well known in state of the art) by which the blind can access the contents of a message (e.g. a web page), or any known type of interface by which a human being can access messages. A communication device of a system according to the invention further comprises at least one web browser. The web browser makes web pages accessible to the user on at least one messaging user interface of the communication device in a well-known manner. According to the invention, user access to the message management means of a messaging client of the portable device is performed via the messaging user interface and the web browser of the communication device. According to another embodiment of the invention, the communication device further comprises a message proxy, the message proxy comprising execution means for executing message management orders received through the device communication means of the communication device from a messaging client located in the portable device. For example, the message proxy might implement POP and SMTP support on behalf of the messaging client of the portable device (i.e. the messaging client of the portable device does not send an receive emails directly, but requests the message proxy to execute those tasks). The message proxy may detect the reception of new messages by the communication device and send them to the messaging client automatically. The message proxy might additionally include filtering means. Message filtering is well known in state of the art, and consists in applying rules on incoming messages and executing a certain filtering task when the associated rule is met (e.g. deleting specific messages, or automatically forwarding certain messages, etc.). The message proxy might also delete automatically messages with attachments greater than a specified threshold, convert messages from one format to another (e.g. convert HTML messages into plain text), or remove attachments which are known to be unsupported by the communication device (e.g. compressed video attachment on a communication device unable to play compressed video), in which case the attachment is preferably left on the message server for later retrieval from a different communication device (supporting compressed video). The message proxy is advantageous especially with portable devices having limited processing and/or storage capacity, since the communication device is normally more powerful than such portable device and can handle those tasks more easily. The message proxy is also useful in case access to certain resources of the communication device is not possible from an external entity such as the portable device, and need to be managed internally. In such cases, the message proxy can manage access to such resources on behalf of the portable device. For example, many messaging clients of communication devices can be customized by means of plug-ins. One example is Eudora, the email client from Qualcomm. It is possible to develop extensions to Eudora (e.g. for message encryption, etc.), which many third parties have done (Entrust and PGP are examples of corporations which have implemented such plug-ins). In general, plug-ins for messaging clients are not based on TCP/IP or on any web protocols. Plug-ins rather consist of libraries calling low-level APIs of the messaging client, or of other mechanisms which are closed enough to not create a security risk on the messaging client. Indeed, TCP/IP is open (it is meant to communicate between any two points on earth through the Internet), while a messaging client should not let a third party anywhere in the world interfere with its behavior. Therefore, according to the invention, it is possible to enable features (such as features not allowed by the messaging clients of the communication device elsewhere than in a plug-in inside the communication device) in the messaging client of the portable device. The messaging client of the portable device contacts the message proxy in the communication device, and the message proxy integrates a plug-in for the communication device, which executes the desired tasks. In order not to open a security risk at the level of the message proxy, which preferably communicates with the portable device via a web protocol (such as TCP/IP), it is advantageous to secure the communications between the message proxy and the portable device (e.g. by using an SSL session, as known in state of the art). The message proxy advantageously comprises message repository emulation means, the message repository emulation means making at least one message stored outside the communication device available to the messaging client of the communication device. In particular, the message proxy emulation means can make messages stored in the portable device visible from messaging clients of the communication device. This gives the user the opportunity to manage their message from another messaging client, if they prefer a messaging client of the communication device rather than the one of the portable device. The messages are in fact managed via the messaging client of the portable device, and stored in the portable device, thanks to the message proxy. Therefore the portability is not affected. The message proxy may also comprise message repository emulation means, the message repository emulation means making at least one message stored inside the communication device available to at least one messaging client located outside of the communication device. In particular, the message proxy emulation means can make messages stored in the communication device visible from the messaging client of the portable device. This gives the user the opportunity to synchronize their messages (e.g. by loading all messages of the communication device into the portable device and emptying the communication device message repositories). This also gives the possibility to manage all messages of the user from a single messaging client (the web pages generated by the messaging client of the portable device offer a consistent interface to the user), which contributes to the resolution of the messaging user interface problem (in particular the user does not have to navigate through different graphical user interfaces anymore). Whatever the communication device being used, the graphical user interface (or audio interface etc.) will be the same. If the communication device is connectable to the Internet, this feature of the message proxy makes it possible to read web mail from the messaging client of the portable device, provided the web mail provider allows it (in general web mail provider offer a POP access which enables this possibility, however sometimes the POP access is charged while regular web mail access is often free of charge). The communication device usually comprises network communication means for connecting the communication device to a network (the network communication means and device communication means may overlap, e.g. a Wifi phone can be connected to a Wifi portable device, thereby using Wifi both for IP telephony and for access to the portable device). The message proxy may then comprise an operator interface relaying operator management orders received through the network communication means to the operator interface of a messaging client located in a portable device (having an operator interface) through device communication means. This is advantageous when the operator cannot have direct access to the portable device, which can occur for example it the operator communicates with the communication device with a communication protocol (e.g. GSM GPRS, CSD, or UMTS protocol) different from the protocol that can be understood by the portable device (e.g. TCP/IP), and when no interface exists in the communication device for routing orders received from the operator using one protocol to the portable device using another protocol. The operator interface can be a simple mapping of the operator interface available in the messaging client of the portable device, the main difference being the protocol used. The message proxy may be implemented in the form of different modules (it is not necessary that the operator interface, the message repository emulation means etc. be part of a single message proxy module, they can be in different modules communicating one with the others).

The mobile phone according to the invention is a communication device of a system according to the invention as described above. In particular, the mobile phone may be a communication device which comprises network communication means for connecting the mobile phone to a network, device communication means for connecting the mobile phone to a portable device, a web browser, a messaging user interface, and a message proxy comprising execution means for executing message management orders received through the device communication means from a messaging client located in a portable device according to the invention. As described above the message proxy improves the interfacing between the portable device and the communication device, when such interfacing is limited.

Preferred embodiments of the invention are detailed below in reference to the above figures.

FIG. 1 shows two form factors of a portable device according to the invention, here a USB smart card. The first form factor 100a is a regular smart card form factor (from which the plug can be pulled out as known in state of the art) while the second form factor 100b is a USB token form factor, consisting of a token in which a USB smart card plug has been inserted in a manner known in state of the art (e.g. Axalto e-gate smart card).

The portable devices of FIG. 1 include a microchip 101 containing processing means and the other means of claim 1. It is preferred but not compulsory to implement such means inside a single microchip. It is possible to use separate microchips, for example a distinct microchip could be used for the external communication means 102.

Figure 2:
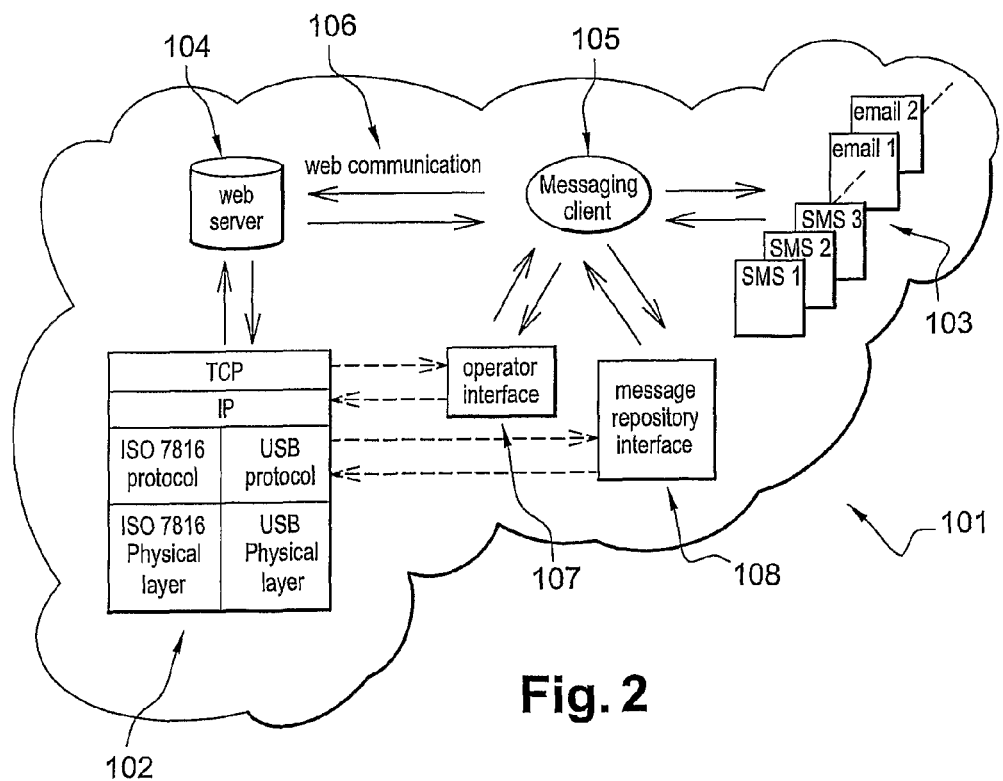
FIG. 2 is a schematic view of the software architecture of a portable device according to a preferred embodiment of the invention.

The architecture of the portable device according to the invention shown on FIG. 2 comprises external communication means 102 (consisting of a TCP/IP stack over USB and ISO 7816 physical layers), message storage means 103 (storing SMS and e-mails in this particular example), a web server 104, a messaging client 105, web communication means 106 for the messaging client 105 to communicate with the web server 104, an operator interface 107 and a message repository interface 108, both interfaces enabling communication with the messaging client 105 through means other than web communication means 106.

The communication device 200 of FIG. 3 is a mobile phone and comprises network communication means 201, device communication means 202 for connecting the mobile phone to a portable device, and a messaging user interface 204 (comprising an LCD 204a, a keypad 204b, a microphone 204c and a speaker 204d).

FIG. 4 shows the architecture of the communication device of FIG. 3, in particular the message proxy 205 and the components communicating with the message proxy, such as the web browser 203 and the messaging clients (203a, 203b . . . ) residing in the communication device, plus other components already shown on FIG. 3.

Figure 5:
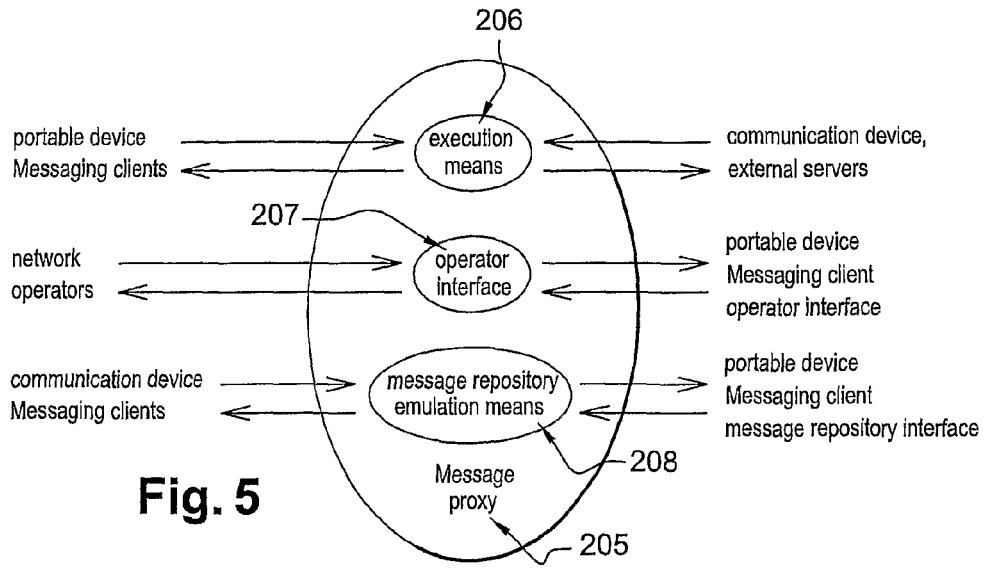
FIG. 5 focuses on the message proxy of the mobile phone architecture of FIG. 4.

FIG. 5 focuses on the message proxy 205 of FIG. 4, especially the execution means 206, the operator interface 207 and the message repository emulation means 208. The portable device messaging client 105 can use the message proxy 205 to communicate with external servers such as e-mail servers (the message proxy 205 can send/receive messages to/from such servers on behalf of the messaging client of the portable device, for example via calls to the mobile phone operating system or libraries), thanks to the execution means 206. The operator interface 207 allows the management of the messaging client 105 of the portable device (100a, 100b) by the network operator through means (operator interface 107 of the portable device (100a, 100b)) more efficient than web communication means (which are useful for communicating with the web server 104 of the portable device (100a, 100b), but the web server 104 is not necessarily accessible to the operator). The message repository emulation means 208 may for example consist of plug-ins for messaging clients (203a, 203b) of the communication device 200 and of a module to access a message repository interface 108 of a messaging client 105 of the portable device (100a, 100b). Message repository emulation means 208 permit access to message repositories of one messaging client from another messaging client, in particular access to a messaging client 105 of the portable device (100a, 100b) from a messaging client (203a, 203b) of the communication device 200 and vice versa. There may be several messaging clients (203a, 203b) in the communication device 200 but also several messaging clients 105 in the portable device (100a, 100b).

Figure 6:
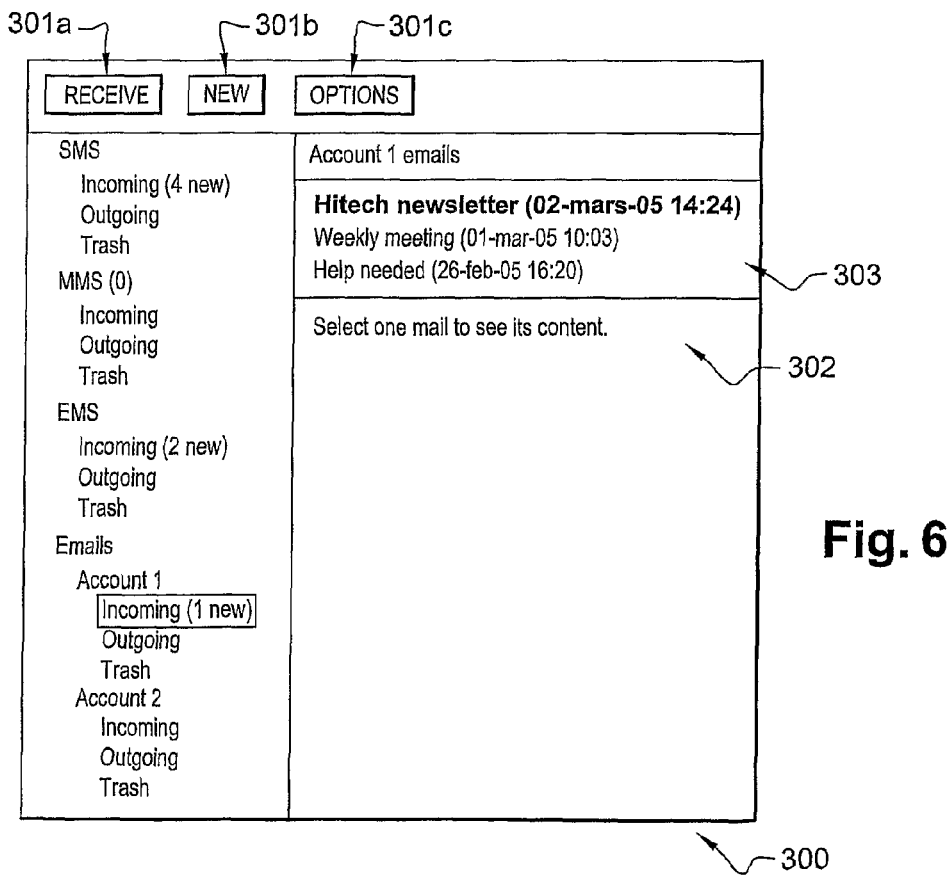
FIG. 6 is an example of a web page generated by the messaging client of a portable device according to a preferred embodiment of the invention, and serving as a graphical user interface.

FIG. 6 is an example of web page 300 generated by the messaging client 105 of a portable device (100a, 100b) according to the invention and shown on the messaging user interface 204 of a communication device 200 according to the invention. On this example, the appearance of the graphical user interface is similar to the appearance of graphical user interfaces of many messaging clients, but it manages different types of messages and it is generated and managed in the portable device (100a, 100b) instead of the communication device 200. The three buttons 301a, 301b, 301c on the top of the graphical user interface are used as follows. The first button 301a is used to check for new messages (messages that are not known by the messaging client 105 of the portable device (110a, 100b)). When the user selects the "Receive" button 301a, the messaging client 105 of the portable device (100a, 100b) may check for and receive the new messages sent to the communication device 200 (SMS, email, MMS, EMS, etc.), if necessary using the message proxy 205 of the communication device 200 (the messages are preferably stored in the message repository of the portable device (100a, 100b)). The messaging client 105 of the portable device (100a, 100b) may further check for and receive the new messages sent to the portable device (100a, 100b) (e.g. SMS sent to a SIM card). The messaging client 105 of the portable device (100a, 100b) may also check for and receive messages sent to external servers (e.g. it may contact POP email servers to receive new emails). The second button 301b ("New") is used to write a new message. When the user selects this button, a new page is displayed asking the user to select the type of message he wants to write and the content of this message. The third button 301c ("Option") is used to configure the messaging client 105 of the portable device (100a, 100b). The options that can be configured may comprise email settings (for each email account: email address, pop server, smtp server, etc.), synchronization and backup settings (does the user want to backup his messages to an external server, what should be the delay between two synchronizations, etc.), connection settings (e.g. in case the portable device (100a, 100b) is a SIM card, shall it use the SMS channel or use the external communication means 201 of the communication device 200 such as GPRS or CSD, etc.), security settings (e.g. encryption and/or authentication of the messages, etc.), or integrity setting (e.g. cryptographic checksum, error correction code, etc.). The web page 300 comprises two types of data (static data 302 and dynamic data 303). Static data 302 comprise images, style sheets, icons, constant text labels etc. Static data 302 are stored in the portable device (100a, 100b) and can be updated (e.g. over the air, if the portable device (100a, 100b) is a SIM card, or by the user through the Internet). Dynamic data 303 comprise messages, dynamic text, miscellaneous information, etc. Dynamic data 303 are dynamically generated by the messaging client 105. Since the graphical user interface is determined by the web pages generated by the portable device (100a, 100b), it is not dependent on the communication device 200, and remains similar when the user connects his portable device (100a, 100b) with another communication device 200.

The invention claimed is:

1. A portable device contactable to a communications device, the portable device comprising:
   a processing means;
   an external communication means for communicating with other devices including the communications device;
   a message storage means for storing messages of a user of the portable device in the portable device;
   a web server operable to communicate with the communications device communications which pertain to the management of messages stored in the message storage means;
   a messaging client comprising:
      web communication means for communicating with said web server including the communications which pertain to the management of messages stored in the message storage means; and
      a message management means for managing, through web pages accessible from said web server, messages including at least one message stored in the portable device thereby providing a web browser executing on the communications device access to message management functionality available through the message management means.

2. The portable device according to claim 1, wherein said messages management means comprises at least one of the following: message listing, selecting, retrieving, reading, scrolling, editing, writing, recording, deleting, sending, receiving, forwarding, filtering, sorting, broadcasting, synchronizing or archiving means.

3. The portable device according to claim 1, wherein said web pages for managing messages are in HTML, XHTML, WML, DHTML, or XML format.

4. The portable device according to claim 1, wherein said portable device is a smart card, an ISO 7816 smart card, a USB smart card, an MMC smart card, a contact-less smart card, a SIM card, a USIM card, a dongle, a USB key, a One Time Password token or a SecureMMC device.

5. The portable device according to claim 1, wherein the portable device further comprises: user restriction means for restricting user access to said web pages for managing messages.

6. The portable device according to claim 5, the portable device storing at least one authentication data or at least one hash of one authentication data, said user restriction means comprising a user authentication means for verifying that the user possesses at least one of said authentication data stored in said portable device or which hash is stored in said portable device.

7. The portable device according to claim 6 in which the authentication data comprises at least one of the following: a user password, a PIN code, or a user biometric template.

8. The portable device according to claim 5 in which the user restriction means comprises a message encryption means.

9. The portable device according to claim 6 or 8, wherein said portable device permanently stores the hash of the authentication data but not the actual authentication data, said message encryption means encrypting the messages with a diversified key, said diversified key being computed from at least a master cryptographic key stored in the portable device and a diversifier, said diversifier comprising at least the authentication data.

10. The portable device according to claim 9, wherein said portable device further comprises: a message re-encryption means, said message re-encryption means being triggered by the modification of at least one of the authentication data comprised in said diversifier, said message re-encryption means consisting of decrypting encrypted messages with an old diversified key and re-encrypting said messages with a new diversified key.

11. The device according to claim 1, the messaging client comprising an operator interface for operator management of the messages of the user without requiring user intervention.

12. The portable device according to claim 11, wherein the operator management of the messages comprises at least one of the following: message backup, anti-virus scanning, SPAM identification, and automatic deletion of old messages.

13. The portable device according to claim 12, wherein the portable device further comprises: an operator restriction means for restricting operator access to said messaging client.

14. The portable device according to claim 13, wherein the operator restriction means comprises at least an operator authentication means.

15. The portable device according to claim 14, wherein the operator authentication means comprises at least one of the following means: a symmetric cryptography authentication, an asymmetric cryptography authentication, an administrative password, or a one time password.

16. The portable device according to claim 1, 5 or 11, the messaging client comprising a message repository interface for granting to applications, other than said messaging client access to messages managed by said messaging client.

17. The portable device according to claim 16 wherein access to the message repository interface being restricted by the same restriction means which restrict user access to said web pages for managing messages.

18. The portable device according to claim 1, 5 or 11, the portable device storing the installation files of a message proxy the installation of the message proxy on a communication device not equipped with the message proxy being triggered by the establishment of the first communication of the portable device with the communication device.

19. A system for message management comprising:
 a portable device comprising;
  a processing means;
  an external communication means for communicating with other devices;
  a message storage means for storing messages of a user of the portable device in the portable device;
  a web server;
  a messaging client comprising web communication means for communicating with said web server; a message management means for managing, through web pages accessible from said web server messages including at least one message stored in the portable device;
 a communication device comprising: a device communication means for communicating with said portable device;
  a messaging user interface;
  a web browser
  wherein user access to the message management means of the messaging client of said portable device is performed via a messaging user interface and the web browser of said communication device.

20. The system according to claim 19, wherein the communication device further comprises: a message proxy said message proxy comprising an execution means for executing message management orders received through said device communication means of the communication device from the messaging client located in said portable device.

21. The system according to claim 20 wherein the communication device comprises a network communication means for connecting the communication device to a network, the portable device wherein the messaging client comprises an operator interface for operator management of the messages of the user without requiring user intervention, the message proxy comprising an operator interface the message proxy operator interface relaying operator management orders received through said network communication means to the operator interface of the messaging client located in said portable device through the device communication means.

22. The system according to claim 20 or 21, wherein the communication device further comprises: at least one messaging client, the message proxy comprising a message repository emulation means, said message repository emulation means making at least one message stored outside the communication device available to said messaging client of the communication device.

23. The according to claim 22, wherein the message proxy comprises the message repository emulation means, said message repository emulation means making at least one message stored inside the communication device available to at least one messaging client located outside of the communication device.

24. The system according to claim 23, wherein the messaging client comprises a message repository interface for granting to applications other than the messaging client access to messages managed by the messaging client, the message repository emulation means of the message proxy being connected with the message repository interface of the messaging client of said portable device.

25. A mobile phone comprising:
- a network communication means for connecting said mobile phone to a network;
- a device communication means for connecting the mobile phone to a portable device, the portable device comprising:
- a processing means;
- an external communication means for communicating with other devices;
- a message storage means for storing messages of a user of the portable device in the portable device;
- a web server;
- a messaging client comprising web communication means for communicating with said web server;
- a message management means for managing, through web pages accessible from said web server messages including at least one message stored in the portable device;
- a web browser;
- a messaging user interface; and
- a message proxy said message proxy comprising execution means for executing message management orders received through said device communication means from a messaging client located in the portable device.

26. The mobile phone according to claim 25, wherein the mobile phone further comprises:
- the message proxy comprising an operator interface, the message proxy operator interface relaying operator management orders received through the network communication means to an operator interface of a messaging client located in wherein the messaging client comprising the operator interface for operator management of the messages of the user without requiring user intervention, through the device communication means.

27. The mobile phone according to claim 25 or 26, said mobile phone comprising at least one messaging client, the message proxy comprising a message repository emulation means said message repository emulation means making at least one message stored outside the mobile phone available to said messaging client of the mobile phone.

28. The mobile phone according to claim 27, the message proxy comprising the message repository emulation means said message repository emulation means making at least one message stored inside the mobile phone available to at least one messaging client located outside of the mobile phone.

29. The mobile phone according to claim 28, wherein the messaging client comprises a message repository interface for granting applications other than said messaging client access to messages managed by said messaging client, the message repository emulation means of the message proxy being connected with the message repository interface of the messaging client of the portable device through the device communication means.

30. The system according to claim 19 wherein the portable device further comprises: user restriction means for restricting user access to said web pages for managing messages.

31. The system according to claim 19 wherein the messaging client comprises an operator interface for operator management of the messages of the user without requiring user intervention.

32. The system according to claim 19 wherein the messaging client comprises a message repository interface for granting to applications, other than said messaging client access to messages managed by said messaging client.

33. The mobile phone according to claim 25 wherein the portable device further comprises: user restriction means for restricting user access to said web pages for managing messages.

34. The mobile phone according to claim 25 wherein the messaging client comprises an operator interface for operator management of the messages of the user without requiring user intervention.

* * * * *